United States Patent
Brown (10) Patent No.: US 9,934,110 B2
(45) Date of Patent: Apr. 3, 2018

(54) METHODS FOR DETECTING OUT-OF-ORDER SEQUENCING DURING JOURNAL RECOVERY AND DEVICES THEREOF

(71) Applicant: NetApp, Inc., Sunnyvale, CA (US)

(72) Inventor: Joseph Brown, Raleigh, NC (US)

(73) Assignee: NetApp, Inc., Sunnyvale, CA (US)

( * ) Notice: Subject to any disclaimer, the term of this patent is extended or adjusted under 35 U.S.C. 154(b) by 79 days.

(21) Appl. No.: 15/145,273

(22) Filed: May 3, 2016

(65) Prior Publication Data

US 2017/0322851 A1 Nov. 9, 2017

(51) Int. Cl.
*G06F 11/00* (2006.01)
*G06F 11/14* (2006.01)
*G06F 17/30* (2006.01)
*G06F 3/06* (2006.01)

(52) U.S. Cl.
CPC .......... *G06F 11/1469* (2013.01); *G06F 3/067* (2013.01); *G06F 3/0619* (2013.01); *G06F 3/0647* (2013.01); *G06F 11/1451* (2013.01); *G06F 17/30144* (2013.01); *G06F 17/30194* (2013.01); *G06F 2201/80* (2013.01); *G06F 2201/805* (2013.01); *G06F 2201/84* (2013.01)

(58) Field of Classification Search
CPC ............. G06F 11/1469; G06F 11/1451; G06F 11/0727; G06F 11/1448; G06F 11/1471; G06F 3/0619; G06F 3/0647; G06F 3/067; G06F 17/30144; G06F 17/30194; G06F 2201/80; G06F 2201/805; G06F 2201/84
See application file for complete search history.

(56) References Cited

U.S. PATENT DOCUMENTS

| | | | |
|---|---|---|---|
| 5,933,838 A * | 8/1999 | Lomet | G06F 11/1471 |
| 8,554,734 B1 * | 10/2013 | Chatterjee | G06F 11/1451 707/640 |
| 2002/0091718 A1 * | 7/2002 | Bohannon | G06F 11/1471 |
| 2009/0265348 A1 * | 10/2009 | Elteto | G06F 21/10 |
| 2013/0117236 A1 * | 5/2013 | Schreter | G06F 17/30356 707/682 |
| 2015/0370644 A1 * | 12/2015 | Graefe | G06F 11/1466 707/624 |

* cited by examiner

*Primary Examiner* — Joseph D Manoskey
(74) *Attorney, Agent, or Firm* — LeClairRyan, a Professional Corporation (57) ABSTRACT

A method, non-transitory computer readable medium and storage server computing device that allocates monotonically increasing sequence numbers to storage operations based on an order of the storage operations corresponding entries in a log. The storage operations are sequenced including by identifying a subset of the storage operations that are parallelizable. A file system data structure is allocated and populated with data associated with one of the storage operations. A determination is made when a rollback is detected based on whether a replay ledger index field of the file system data structure comprises one of the sequence numbers that is greater than another one of the sequence number corresponding to the one of the storage operations. The another one of the sequence numbers is inserted into the replay ledger index field, when the determining indicates that a rollback is not detected.

18 Claims, 6 Drawing Sheets

METHODS FOR DETECTING OUT-OF-ORDER SEQUENCING DURING JOURNAL RECOVERY AND DEVICES THEREOF

FIELD

This technology relates to facilitating data integrity in data storage networks, and more particularly to methods and devices for detecting out-of-order sequencing during journal recovery.

BACKGROUND

Storage servers can store data redundantly, e.g., across multiple data storage devices. Storage servers may employ various forms of data storage devices, such as hard disk drives, solid state drives, flash drives, or tape devices for example. The data storage devices are typically implemented as one or more storage volumes that comprise a cluster of data storage devices, in which the volumes define an overall logical arrangement of storage space. For example, a storage server can serve a large number of discrete volumes each generally associated with its own file system.

To improve performance, storage servers can temporarily store various data storage operations and associated data received from client devices in a region of system memory. By storing the storage operations and data they receive in system memory, the storage servers can immediately return an acknowledgement message to the client devices rather than waiting for slower data storage devices to actually store the data prior to the acknowledgement being sent. However, system memory can be erased before the data is stored to data storage devices, e.g., in an event of a power (or other) failure.

To reduce the likelihood of data loss in such circumstances, storage servers may also store the storage operations and associated data in non-volatile random access memory (NVRAM), e.g., in a log stored in the NVRAM. By initially storing the storage operations in the log, the storage server can immediately return an acknowledgment to the client devices rather than wait for the operation to complete on one or more data storage devices.

Moreover, in the event of failure of the storage server, the storage operations can be replayed, thereby preventing loss of data. The NVRAM can have various associated circuitry to prevent data loss, e.g., battery backup, flash-type memory, etc. By logging storage operations (e.g., create file, write data, delete data, etc.) as "journal" entries in the log, a storage server can conform with data storage protocols that require the storage server only acknowledge storage operations after writing data to persistent storage.

The log can accumulate storage operations until a consistency point is triggered. Consistency points can be triggered at various time intervals (e.g., fixed time intervals), or when other events arise, e.g., the NVRAM is almost fully filled. At each consistency point, data is transferred from the storage server system memory (e.g., the NVRAM) to underlying data storage volumes on data storage devices, and the system memory is cleared of the transferred data upon successful transfer.

If the storage server's operations are interrupted unexpectedly, e.g., because of power failure or other subsystem problem, its operating system or file system can recover by using information stored in the log between the time of the last consistency point and the unexpected interruption, e.g., by using a replay operation.

Technological advances have caused a significant reduction in the price of NVRAM and processors with a concomitant increase in logic density. Thus, it is now possible to employ many more NVRAM and many more processors (or processor cores) at a lower cost than was previously possible. It can be desirable to have a large amount of NVRAM to increase the throughput of the storage server. On the other hand, having more storage operations that are saved in the log can cause an increase in the time required to complete a replay operation.

To make it possible for the storage server to operate at high speed while maintaining an acceptable recovery time, the replay time per operation has been reduced to compensate for the greater number of operations being recorded in the log. The reduction in replay time per operation is made possible based on a sequencing process by which storage operations are identified as parallelizable and handled concurrently. In particular, logged storage operations determined to be parallelizable can be transferred to storage volumes concurrently by different processors or processor cores.

However, parallelization cannot be completed without regard to the operation tasks because storage operations can modify the same location offset or otherwise be overlapping or conflicting. If logged storage operations are replayed to storage volumes in sequence (e.g., in the same order as they appear in the log), then the storage volumes will be consistent with the order in which client devices transmitted the storage operations. However, when storage operations are handled in parallel, it is possible that a second storage operation can complete before a first storage operation, which is dependent on the second storage operations, resulting in inconsistencies in file system data.

The rules for identifying storage operations that are parallelizable are non-trivial and complex. Accordingly, storage operations that conflict are occasionally identified as parallelizable and replayed as such, resulting in inconsistent data in the file system. Currently, there is currently no effective, programmatic way to detect, in real-time, logic errors in the sequencing process, which resulted in a mis-identification of storage operations as parallelizable, in order to prevent inconsistent data from being written to data storage devices.

DETAILED DESCRIPTION

Figure 1:
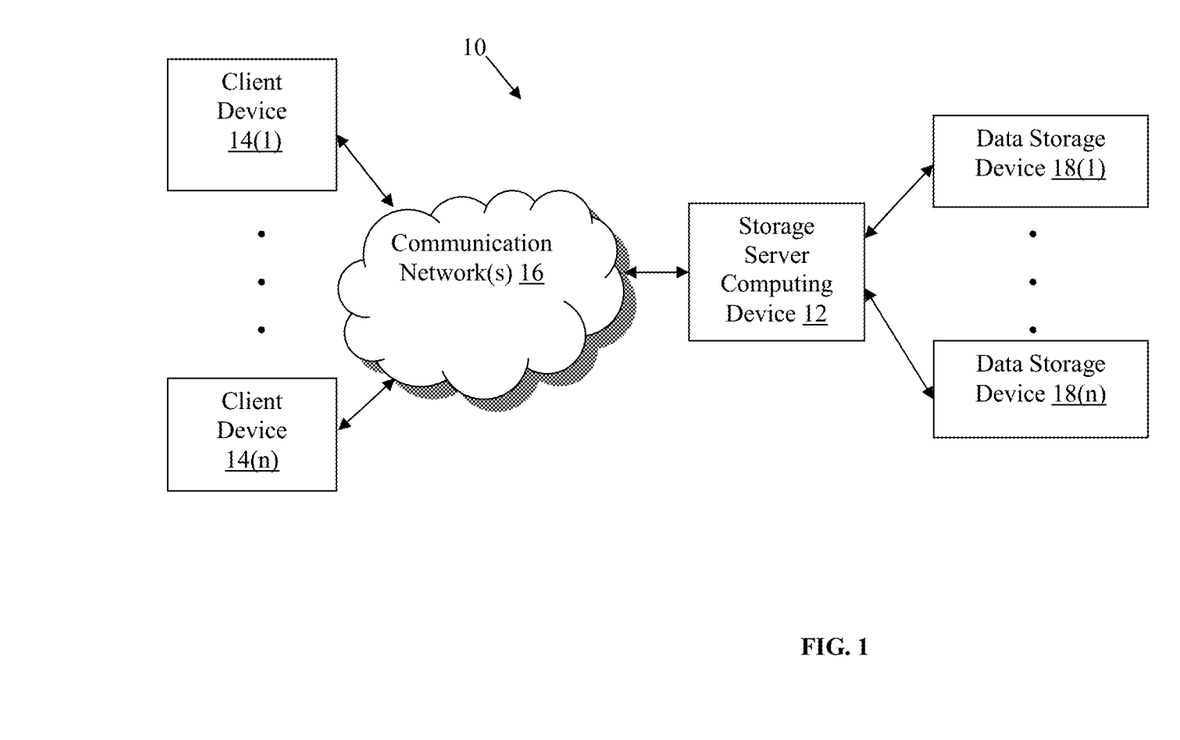
FIG. 1 is a block diagram of a network environment with an exemplary storage server computing device.

A network environment 10 including an exemplary storage server computing device 12 is illustrated in FIG. 1. The storage server computing device 12 in this example is coupled to client devices 14(1)-14(n) via communication network(s) 16 and data storage devices 18(1)-18(n) via another communication network, direct connection, or switch (not shown), although this network environment 10 can include other numbers and types of systems, devices, components, and/or elements in other configurations. Additionally, the network environment 10 may include other network devices such as one or more routers and/or switches, for example, which are well known in the art and thus will not be described herein. This technology provides a number of advantages including methods, non-transitory computer readable media, and devices that programmatically detect errors in the sequencing of storage operations during journal recovery, and prevent inconsistent data from being written to backend data storage devices.

Figure 2:
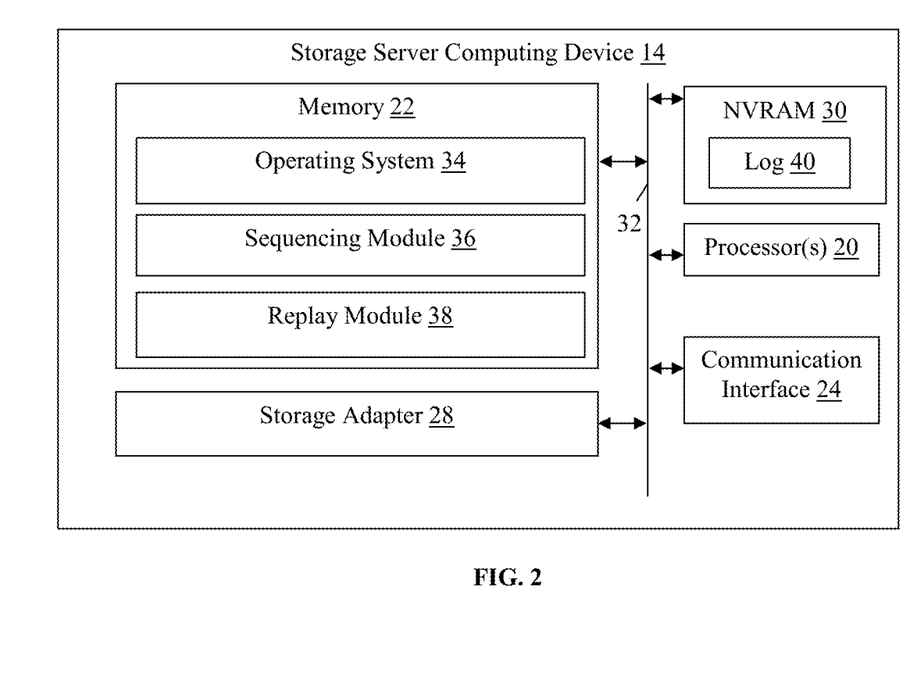
FIG. 2 is a block diagram of an exemplary storage server computing device shown in FIG. 1.

Referring to FIG. 2, a block diagram of the exemplary storage server computing device 12 is illustrated. The storage server computing device 12 generally provides file services relating to the organization of information on the data storage devices 18(1)-18(n) on behalf of the client devices 14(1)-14(n). In this example, the storage server computing device 12 includes processor(s) 20, a memory 22, a communication interface 24, a storage adapter 26, and a non-volatile random access memory (NVRAM) 30, which are coupled together by a bus 32 or other communication link.

The processor(s) 20 of the storage server computing device 12 may execute a program of stored instructions for one or more aspects of the this technology, as described and illustrated by way of the embodiments herein, although the processor(s) 20 could execute other numbers and types of programmed instructions. The processor(s) 20 in the storage server computing device 12 may include one or more central processing units (CPUs) or general purpose processors with one or more processing cores, for example.

The memory 22 of the storage server computing device 12 may include any of various forms of read only memory (ROM), random access memory (RAM), flash memory, non-volatile or volatile memory, or the like, or a combination of such devices, for example. In this example, the memory includes an operating system 34, a sequencing module 36, and a replay module 38, although other types and/or numbers of applications or modules can also be included in other examples.

The operating system 34 is configured to functionally organize stored data by invoking storage operations to facilitate file services provided by the storage server computing device 12. In particular, the operating system 34 implements a file system to logically organize information as a hierarchical structure of directories and files on the data storage devices 18(1)-18(n). Accordingly, the operating system 34 cooperates with the storage adapter 28 to access information requested by the client devices 14(1)-14(n) and stored on the data storage devices 18(1)-18(n), among other functions.

The sequencing module 36 is configured to analyze a log 40 in the NVRAM 30 that includes storage operations to determine an efficient order of execution of the storage operations in order to facilitate a consistency point or recover from a failure, for example. Accordingly, the sequencing module 36 can determine which of the storage operations in the log 40 can be executed in parallel in order to reduce the overall time required to process the storage operations, as described and illustrated in more detail later.

The replay module 38 is configured to execute the storage operations in the log 40 based on the output of the sequencing module 36 that includes the order of execution of the storage operations. Accordingly, the replay module 38 processes the storage operations in order to commit data associated with the storage operations to the data storage devices 18(1)-18(n), such as by writing user data or metadata stored in the NVRAM to storage locations on volumes hosted by the data storage devices 18(1)-18(n), for example. The storage operations are acknowledged to the client devices 14(1)-14(n), and effectively buffered in the log 40 of the NVRAM 30, in order to improve latency from the perspective of the client devices 14(1)-14(n), among other advantages.

The communication interface 24 of the storage server computing device 12 can include one or more network interface controllers (NICs) for operatively coupling and communicating between the storage server computing device 12 and the client devices 14(1)-14(n), which are coupled together by the communication network(s) 16, although other types and numbers of communication networks or systems with other types and numbers of connections and configurations to other devices and elements also can be used.

By way of example only, the communication network(s) 16 can use TCP/IP over Ethernet and industry-standard protocols, including NFS, CIFS, SOAP, XML, LDAP, and SNMP, although other types and numbers of communication networks, can be used. The communication network(s) 16 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like. The communication network(s) 16 may also comprise any local area network and/or wide area network (e.g., Internet), although any other type of traffic network topologies may be used.

The storage adapter 28 can cooperate with the operating system 34 to access information requested by the client devices 14(1)-14(n). The information may be stored on the data storage devices 18(1)-18(n) in logical volumes, for example. The storage adapter 28 includes input/output (I/O) or communication interface circuitry that couples to the data storage devices 18(1)-18(n) over an I/O interconnect arrangement such as a conventional high-performance, Fibre Channel serial link topology, SAS, SCSI, or SATA, for example. The storage adapter 28 can communicate with the data storage devices 18(1)-18(n) over a network (or switch) (not shown). The data storage devices 18(1)-18(n) can be housed in an enclosure in the same rack as the storage server computing device 12 or in a different rack, for example, and the data storage devices 18(1)-18(n) can also be located elsewhere.

The NVRAM 30 provides fault-tolerant backup of data, enabling the integrity of storage operations to survive a service interruption based on a power failure or other fault. The size of the NVRAM is variable and can be sufficiently large to log a specified number of storage operations and associated data. The NVRAM 30 can be written to before each request received from one of the client devices 14(1)-14(n) is transferred or committed to one or more of the data storage devices 18(1)-18(n), but before an acknowledgment is returned to the requesting one of the client devices 14(1)-14(n).

The NVRAM 30 can store a log 40, which can be a file or other data structure that is used to journal storage operations in sequential order as received from the client devices 14(1)-14(n). As the storage server computing device 12 receives storage operations (e.g., to create files, write data, etc.), the storage server computing device 12 can first store them in the log 40. When replayed by the replay module 38, e.g., to replay the data to data storage devices 18(1)-18(n), the result is as if the received storage operations were directly committed to the data storage devices 18(1)-18(n). In some examples, other persistent media may be employed to store the log 40, e.g., solid state drives or other non-volatile storage.

Referring back to FIG. 1, each of the client devices 14(1)-14(n) in this example includes a processor, a memory, a communication interface, and optionally an input device, and a display device, which are coupled together by a bus or other link, although each of the client devices 14(1)-14(n) can have other types and numbers of components or other elements and other numbers and types of network devices could be used.

The client devices 14(1)-14(n) may run interface applications that provide an interface to make requests for and send content and/or data to the storage server computing device 12 via the communication network(s) 16, for example. Each of the client devices 14(1)-14(n) may be a conventional personal computer, a tablet computing device, a smart phone, a virtual machine running in a cloud, an application server hosting applications that utilize backend storage, or other processing and/or computing device, for example.

The data storage devices 18(1)-18(n) can be hard disk drives, solid state drives, flash drives (e.g., in an all flash array), optical disk-based storage, any combination thereof, or any other type of stable, non-volatile storage suitable for storing files or objects in storage volumes for short or long term retention, for example. The data storage devices 18(1)-18(n) optionally host one or more volumes based on a Redundant Array of Inexpensive Disks (RAID) architecture or other topology facilitating data persistency, although other types and numbers of volumes in other topologies can also be used.

Although examples of the storage server computing devices 12, client devices 14(1)-14(n), and data storage devices 18(1)-18(n), are described and illustrated herein, it is to be understood that the devices and systems of the examples described herein are for exemplary purposes, as many variations of the specific hardware and software used to implement the examples are possible, as will be appreciated by those skilled in the relevant art(s). In addition, two or more computing systems or devices can be substituted for any one of the systems in any embodiment of the examples.

The examples also may be embodied as one or more non-transitory computer readable media having instructions stored thereon for one or more aspects of the present technology, as described and illustrated by way of the examples herein, which when executed by the processor, cause the processor to carry out the steps necessary to implement the methods of this technology, as described and illustrated with the examples herein.

Figure 3:
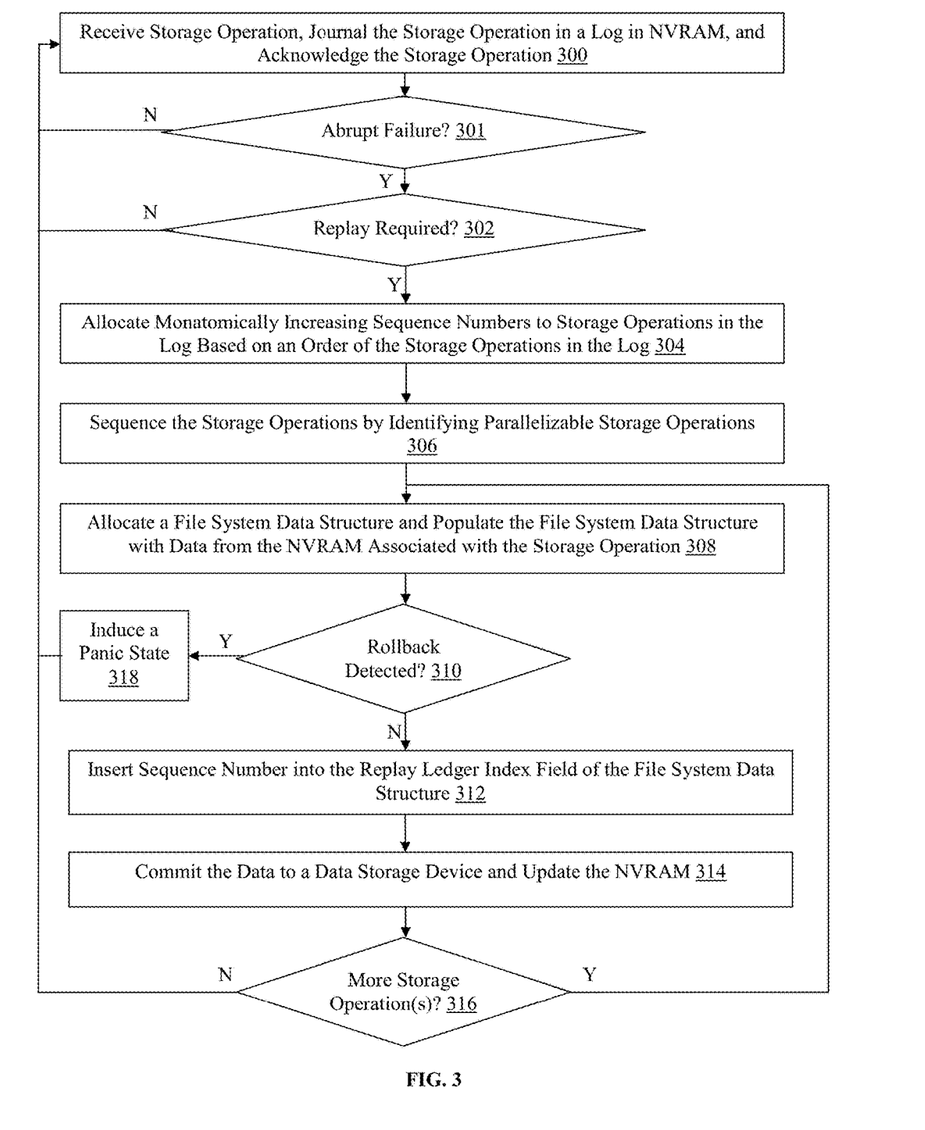
FIG. 3 is a flowchart of an exemplary method for detecting out-of-order sequencing during journal recovery.

An exemplary method for detecting out-of-order sequencing during journal recovery will now be described with reference to FIGS. 1-6. Referring more specifically to FIG. 3, in step 300, the storage server computing device 12 receives a storage operation and journals the storage operation in the log 40 in the NVRAM 30. The storage operation can be received from one of the client devices 14(1)-14(n) and can be a command to create a file or write data to a file on one or more of the data storage devices 18(1)-18(n), for example, although other types of storage operations can also be received from the one of the client devices 14(1)-14(n).

In examples in which the storage operation is a command to write data to a file on one or more of the data storage devices 18(1)-18(n), the storage server computing device 12 can also store the data to be written in the NVRAM 30. The NVRAM 30 can then be accessed by the storage server computing device 12 when subsequently committing the data to the one or more of the data storage devices 18(1)-18(n), as described and illustrated in more detail later with reference to step 314 of FIG. 3. Subsequent to journaling the storage operation in the log 40, the storage server computing device 12 sends an acknowledgement message to the one of the client devices 14(1)-14(n) via the communication network(s) 16.

Figure 4:
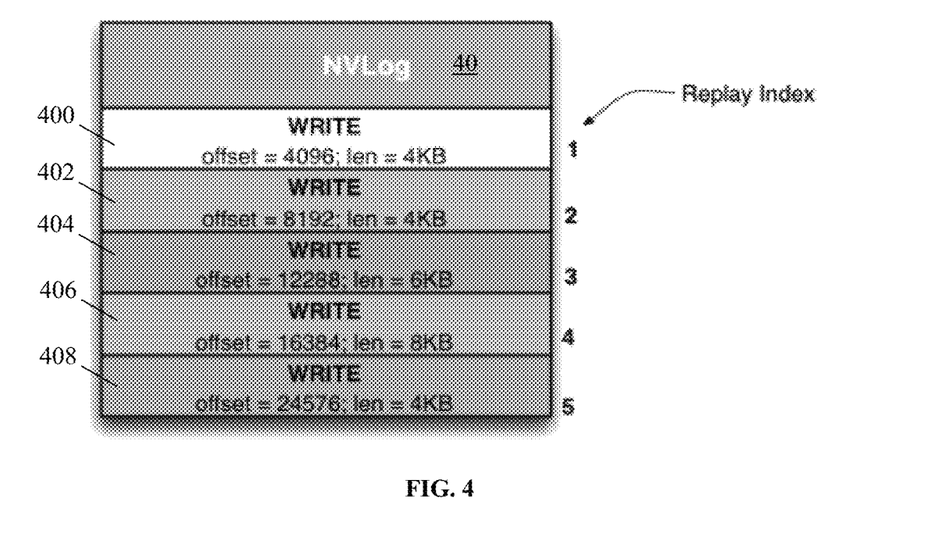
FIG. 4 is an exemplary non-volatile log (NVLog) in non-volatile random access memory (NVRAM) with sequence numbers allocated to storage operations.

Referring more specifically to FIG. 4, an exemplary log 40, referred to as a non-volatile log (NVLog), is illustrated. In this example, the log 40 includes exemplary write storage commands 400-408 that might be received from one or more of the client devices 14(1)-14(n) and subsequently journaled or stored in the log 40. Each of the write commands 400-408 in this example includes an offset corresponding to a storage location in a file stored on one or more of the data storage devices 18(1)-18(n) and a length of data to be written at the offset. Other types and numbers of storage operations can also be received by the storage server computing device 12 and stored in the log 40 in other examples.

Referring back to FIG. 3, in step 301, the storage server computing device 12 determines whether there was an abrupt failure, such as a shutdown, power failure, or other unplanned event, for example, although other types of abrupt failures can also occur. If the storage server computing device 12 determines that there is not an abrupt failure, then the No branch is taken back to step 300 and the storage server computing device 12 continues receiving, journaling, and acknowledging storage operations. However, if the storage server computing device determines in step 301 that an abrupt failure has occurred, then the Yes branch is taken to step 302.

In step 302, the storage server computing device 12 determines whether a replay of the storage operations in the log 40 is currently required in order to execute the storage operations and commit corresponding data to the data storage devices 18(1)-18(n). A replay can be required when the abrupt failure occurs at a point in time in which the file system is not up-to-date. Accordingly, if the file system is not up-to-date, then the storage server computing device 12 will determine that a replay is required in step 302. Alternatively, if the storage server computing device 12 determines that the file system is up-to-date, then the storage server computing device will determines that a replay is not required in step 302.

Accordingly, if the storage server computing device 12 determines in step 302 that a replay is not required, then the no branch is taken from step 302 back to step 300 and the storage server computing device 12 continues to receive and process storage operations, as described and illustrated in more detail earlier. However, if the storage server computing device 12 determines that a replay is required, then the Yes branch is taken to step 304.

In step 304, the storage server computing device 12 allocates monotonically increasing unique sequence numbers to the storage operations in the log 40 based on an order of the storage operations in the log 30. Accordingly, when the storage operations are received in step 300, the storage server computing device 12 journals the storage operations in the log 40 in the order that the storage operations are received, and the sequence numbers are allocated to the storage operations in step 304 in the corresponding order. Referring back to FIG. 4, exemplary sequence numbers, referred to as replay indices, are illustrated as allocated to each of the storage operations 400-408.

In one particular example, the storage server computing device 12 translates the storage operations into native file system messages for example. The native file system messages are then tagged by the storage server computing device 12 with a corresponding one of the sequence numbers in order to carry out the allocation in step 304. Optionally, the sequence numbers are maintained on a per aggregate basis, with the aggregate representing a logical container for a group of the data storage devices 18(1)-18(n). Other methods for allocating the sequence numbers can also be used in other examples.

In step 306, the storage server computing device 12 sequences the storage operations. In order to sequence the storage operations, the storage server computing device 12 applies logic or a number of rules to identify a subset of the storage operations that are parallelizable. One exemplary method for sequencing the storage operations by generating a dependency hash that defines an order of execution of the storage operations is described and illustrated in U.S. patent application Ser. No. 14/281,760 filed on May 19, 2014 and entitled "Parallelizing Playback of Logged Data Storage Operations," which is hereby incorporated by reference in its entirety.

Figure 5:
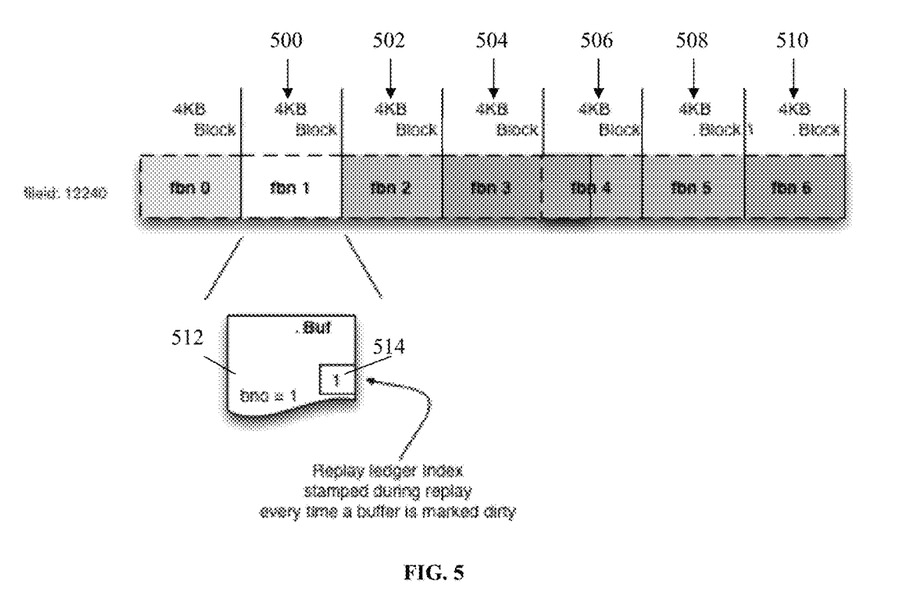
FIG. 5 is an exemplary set of blocks associated with the storage operations of the log of FIG. 4 and that each have an associated file block number along with a file system data structure associated with one of the blocks and including a replace ledger index field.

Referring more specifically to FIG. 5, an exemplary set of blocks 500-510 associated with the storage operations 400-408 of the log 40 of FIG. 4 is illustrated. The blocks 500-510 in this particular example each have an associated file block number and a size of 4 KB. Accordingly, the storage operations 400 and 402 are write storage operations, as illustrated in FIG. 4, that write data to block 500 and 502, respectively, based on the associated offsets (4 KB and 8 KB, respectively) and length (4 KB).

However, the storage operation 404 is a write operation having an offset of 12 KB and a length of 6 KB. Accordingly, the storage operation 404 will write data to the block 504 and the first half of the block 506. Additionally, the storage operation 406 is a write operation having an offset of 16 KB and a length of 8 KB. Accordingly, the storage operation 406 will write data at the beginning of block 506 to the end of block 508, which therefore overlaps with the storage operation 404 at the first half of block 506. Since storage operations 404 and 406 overlap or collide, they are not parallelizable and must be executed in the order that they were received in order to prevent an inconsistency in the file system. The storage operation 408 will write data to the block 510 based on the associated 24 KB offset and 4 KB length, and is therefore parallelizable along with storage operations 400 and 402.

Referring back to FIG. 3, in step 308, the storage server computing device 12 allocates a file system data structure and populates the file system data structure with data from the NVRAM 30 associated with one of the storage operations. The one of the storage operations can be identified based on the result of the sequencing of the storage operations in step 306. Additionally, the storage server computing device 12 can also mark the allocated file system data structure as being dirty to reflect that user data or metadata must be written to disk during the next consistency point.

Referring back to FIG. 5, the file system data structure in this particular example is a buffer that corresponds to a file block number and one of the blocks 500-510. While only buffer 512 corresponding to file block number one and block 500 is illustrated for simplicity in FIG. 5, one or more buffers can also be allocated for each of the blocks 502-510 in subsequent iterations of step 308 of FIG. 3. In this example, the buffer 512 includes a replay ledger index field 514 that is populated as described and illustrated later with reference to step 312 of FIG. 3.

In step 310, the storage server computing device 12 determines whether a rollback is detected based on whether a replay ledger index field of the file system data structure includes a sequence number that is greater than the sequence number corresponding to the one of the storage operations. If the storage server computing device 12 determines that a rollback is not detected, then the No branch is taken to step 312.

In step 312, the storage server computing device 12 inserts the sequence number, corresponding to the one of the storage operations, which is tagged to the corresponding native file system message in this particular example, into the replay ledger index field. Accordingly, the replay ledger index field of each filesystem data structure stores a sequence number, which is based on an order of storage operations in the log 40, of the last storage operation that dirtied the file system data structure.

Referring back to FIGS. 4-5, none of the storage operations 402-408 access block 500 and, accordingly, the replay ledger index field 514 of the buffer 512 will not have any sequence number when allocated by storage server computing device 12 during the replay of the storage operation 400. Accordingly, the storage server computing device 12 will not detect a rollback in step 310 of FIG. 3 and will insert the sequence number "1", which is tagged to the native file system message translated from the storage operation 400, in step 312 of FIG. 3.

In step 314, the storage server computing device 12, commits the data, which was populated in the file system data structure in step 308, to one or more of the data storage devices 18(1)-18(n). The storage server computing device 12 also updates the NVRAM 30, such as by removing the data and/or the storage operation. In step 316, the storage server computing device 12 determines whether there are any more storage operation(s) in the log 40. If the storage server computing device 12 determines there is at least one storage operation in the log 40, then the Yes branch is taken back to step 308.

Figure 6:
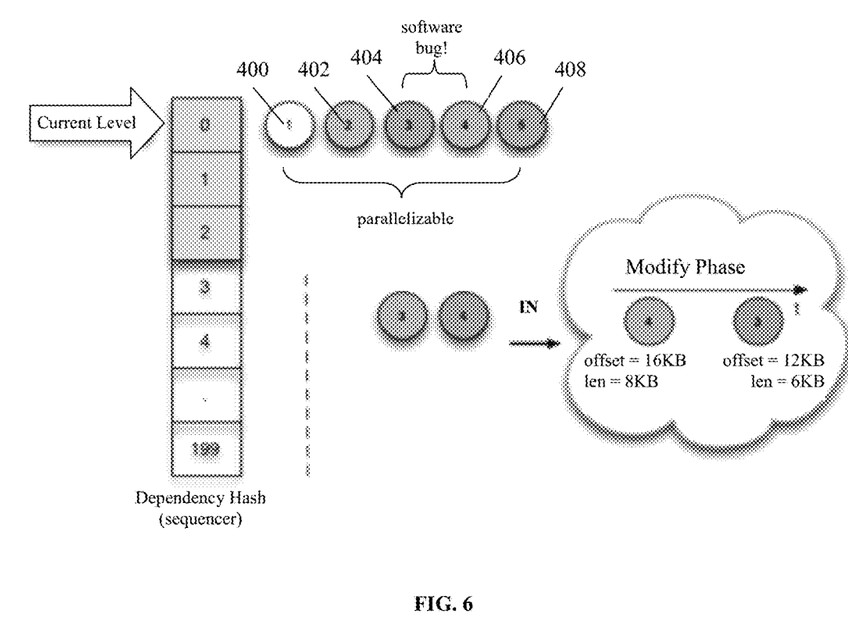
FIG. 6 is an exemplary dependency hash resulting from an improper sequencing process performed based on the storage operations of the log of FIG. 4.

In step 308, the storage server computing device 12 again allocates a file system data structure and populates the file system data structure with data from the NVRAM 30 associated with another storage operation identified based on the output of the sequencing of step 306. In step 310 in this iteration, the storage server computing device 12 again determines whether a rollback is detected. Referring more specifically to FIG. 6, an exemplary dependency hash resulting from an improper sequencing process performed based on the storage operations of the log 40 of FIG. 4 is illustrated. The dependency hash can be generated as a result of the sequencing of step 306, although other types of outputs that reflect an order or execution of the storage operations can also be used.

In this particular example, the sequencing of step 306 has resulted in an incorrect determination that all of the storage operations 400-408 are parallelizable. However, storage operations 404 and 406 must be executed in the order that they were received from one or more of the client devices 14(1)-14(n) because they collide at block 506. Accordingly, if storage operations 404 and 406 are inappropriately identified by the sequencing in step 306 as parallelizable, a race condition could exist and the result would be indeterminate. Prior to the technology described and illustrated herein, there could be an inconsistency in the data in the file system in this example.

However, with this technology, a rollback will be detected by the storage server computing device 12 in step 310 if the storage operation 406 is replayed before the storage operation 404. More specifically, the storage server computing device 12 will insert the sequence number of "4" into the replay ledger index field of the buffer corresponding to block 506 in step 312 during replay of the storage operation 406.

Assuming replay of storage operation 404 occurs after replay of storage operations 406, the storage server computing device 12 will determine in step 310 that the buffer corresponding to block 506 has a replay ledger index field with a sequence number of "4", which is greater than the sequence number "3" that was allocated to the storage operation 404, as described and illustrated in step 304. Accordingly, the storage server computing device 12 will detect a rollback, as described and illustrated in step 310, if storage operation 406 is replayed prior to the storage operation 404 in this example.

Referring to FIG. 3, if the storage server computing device 12 determines that a rollback is detected in step 310 in this iteration, then the Yes branch is taken to step 318. In step 318, the storage server computing device 12 induces a panic state. In this particular example, the storage server computing device 12 re-sequences based on the order of the storage operations in the log 40 and replays the storage operations in serial upon reboot.

Although relatively slow and consuming significantly more resources, replaying the storage operations in serial in the order in which the storage operations were received from the client devices 14(1)-14(n) will guarantee consistency of the data in the file system. However, other actions can be taken by the storage server computing device 12 when a panic state is induced in other examples.

Subsequent to inducing the panic state in step 318, or if the storage server computing device 12 determines in step 316 that there are no more storage operations in the log 40 and the No branch is taken, then the storage server computing device 12 proceeds back to step 300 and receives and processes another storage operations from one of the client devices 14(1)-14(n). If the storage server computing device replays all of the storage operations and the No branch is taken from step 316, then the sequencing performed in step 306 was accurate and there will not be any inconsistencies in the file system data.

With this technology, file system inconsistencies, which result from logic errors in the sequencing of storage operations, can advantageously be prevented. Accordingly, this technology guarantees an appropriate order of replay of storage operations during journal recovery. In particular, journal recovery will proceed with this technology by taking advantage of parallel processing when the sequencing of storage operations is accurate, while inaccurate sequencing of storage operations will result in a replay of storage operations in serial. Accordingly, this technology reduces the overall time required for journal recovery, and the average time for storage operation replay, while guaranteeing consistency of the file system.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method, comprising:
allocating, by a computing device, a plurality of sequence numbers to each of a plurality of storage operations based on an order of the storage operations in a log;
sequencing, by the computing device, the storage operations comprising identifying a subset of the storage operations that are parallelizable;
allocating, by the computing device, at least one file system data structure and populating the file system data structure with data associated with one of the storage operations;
determining, by the computing device, when a rollback is detected based on a comparison of one of the sequence numbers in a replay ledger index field of the file system data structure with another one of the sequence numbers, the one of the sequence numbers corresponding to another one of the storage operations and the another one of the sequence numbers corresponding to the one of the storage operations; and
inserting, by the computing device, the another one of the sequence numbers into the replay ledger index field of the file system data structure, when the determining indicates that a rollback is not detected.

2. The method of claim 1, further comprising inducing, by the computing device, a panic state comprising resequencing the storage operations based on the order of the storage operations in the log and replaying the storage operations in serial, when the determining indicates that a rollback is detected.

3. The method of claim 2, wherein the one of the storage operations and the another one of the storage operations are included in the subset of the storage operations that are parallelizable.

4. The method of claim 1, wherein the allocating, populating, determining, and inserting together comprise replaying the one of the storage operations and the method further comprises repeating, by the computing device, the replaying for each other of the storage operations.

5. The method of claim 1, further comprising translating, by the computing device, each of the storage operations into one of a plurality of native file system messages, wherein the allocating further comprises tagging the native file system messages with the sequence numbers and the another one of the sequence numbers is tagged to one of the native file system messages translated from the one of the storage operations.

6. The method of claim 1, wherein the file system data structure comprises a buffer, the buffer corresponds to a file block number, and the one of the storage operations and another one of the storage operations both comprise operations to modify file data or metadata at a storage location corresponding to the file block number.

7. A non-transitory machine readable medium having stored thereon instructions for detecting out-of-order sequencing during journal recovery comprising machine executable code which when executed by at least one machine causes the machine to:
- allocate a plurality of sequence numbers to each of a plurality of storage operations based on an order of the storage operations in a plurality of corresponding entries in a log;
- sequence the storage operations comprising identifying a subset of the storage operations that are parallelizable;
- allocate at least one file system data structure and populate the file system data structure with data associated with one of the storage operations;
- determine when a rollback is detected based on a comparison of one of the sequence numbers in a replay ledger index field of the file system data structure with another one of the sequence numbers, the one of the sequence numbers corresponding to another one of the storage operations and the another one of the sequence numbers corresponding to the one of the storage operations; and
- insert the another one of the sequence numbers into the replay ledger index field of the file system data structure, when the determining indicates that a rollback is not detected.

8. The non-transitory machine readable medium of claim 7, wherein the machine executable code when executed by the machine further causes the machine to induce a panic state, resequence the storage operations based on the order of the storage operations in the log, replay the storage operations in serial, when the determining indicates that a rollback is detected.

9. The non-transitory machine readable medium of claim 8, wherein the one of the storage operations and the another one of the storage operations are included in the subset of the storage operations that are parallelizable.

10. The non-transitory machine readable medium of claim 7, wherein the allocating, populating, determining, and inserting together comprise replaying the one of the storage operations and the machine executable code when executed by the machine further causes the machine to repeat the replaying for each other of the storage operations.

11. The non-transitory machine readable medium of claim 7, wherein the machine executable code when executed by the machine further causes the machine to:
- translate each of the storage operations into one of a plurality of native file system messages; and
- tag the native file system messages with the sequence numbers, wherein the another one of the sequence numbers is tagged to one of the native file system messages translated from the one of the storage operations.

12. The non-transitory machine readable medium of claim 7, wherein the file system data structure comprises a buffer, the buffer corresponds to a file block number, and the one of the storage operations and another one of the storage operations both comprise operations to modify file data or metadata at a storage location corresponding to the file block number.

13. A computing device, comprising:
- a memory containing machine readable medium comprising machine executable code having stored thereon instructions for detecting out-of-order sequencing during journal recovery; and
- a processor coupled to the memory, the processor configured to execute the machine executable code to cause the processor to:
  - allocate a plurality of sequence numbers to each of a plurality of storage operations based on an order of the storage operations in a plurality of corresponding entries in a log;
  - sequence the storage operations comprising identifying a subset of the storage operations that are parallelizable;
  - allocate at least one file system data structure and populate the file system data structure with data associated with one of the storage operations;
  - determine when a rollback is detected based on a comparison of one of the sequence numbers in a replay ledger index field of the file system data structure with another one of the sequence numbers, the one of the sequence numbers corresponding to another one of the storage operations and the another one of the sequence numbers corresponding to the one of the storage operations; and
  - insert the another one of the sequence numbers into the replay ledger index field of the file system data structure, when the determining indicates that a rollback is not detected.

14. The computing device of claim 13, wherein the processor is further configured to execute the machine executable code to further cause the processor to induce a panic state, resequence the storage operations based on the order of the storage operations in the log, replay the storage operations in serial, when the determining indicates that a rollback is detected.

15. The computing device of claim 14, wherein the one of the storage operations and the another one of the storage operations are included in the subset of the storage operations that are parallelizable.

16. The computing device of claim 13, wherein the allocating, populating, determining, and inserting together comprise replaying the one of the storage operations and the processor is further configured to execute the machine executable code to further cause the processor to repeat the replaying for each other of the storage operations.

17. The computing device of claim 13, wherein the processor is further configured to execute the machine executable code to further cause the processor to:
- translate each of the storage operations into one of a plurality of native file system messages; and
- tag the native file system messages with the sequence numbers, wherein the another one of the sequence numbers is tagged to one of the native file system messages translated from the one of the storage operations.

18. The computing device of claim 13, wherein the file system data structure comprises a buffer, the buffer corresponds to a file block number, and the one of the storage operations and another one of the storage operations both comprise operations to modify file data or metadata at a storage location corresponding to the file block number.

* * * * *